(12) United States Patent
Takagi et al.

(10) Patent No.: US 6,718,187 B1
(45) Date of Patent: Apr. 6, 2004

(54) HANDS-FREE TELEPHONE APPARATUS FOR VEHICLES AND CONTROL-METHOD THEREFOR

(75) Inventors: Toru Takagi, Kanagawa-ken (JP); Toshirou Muramatsu, Kanagawa-ken (JP); Norimasa Kishi, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 532 days.

(21) Appl. No.: 09/635,189

(22) Filed: Aug. 9, 2000

(30) Foreign Application Priority Data

Aug. 10, 1999 (JP) .............................. P11-226610
Jun. 21, 2000 (JP) ..................................... P2000-186960

(51) Int. Cl.⁷ .............................. H04B 1/38; H04M 1/00
(52) U.S. Cl. .................... 455/569; 455/569.2; 455/563; 455/550.1; 455/79; 455/567; 379/420.1
(58) Field of Search .............................. 455/567, 575.9, 455/569.1, 569.2, 552.1, 550.1, 563, 79, 556.1, 420.01, 420.02, 420.03, 420.04; 379/428.03, 432

(56) References Cited

U.S. PATENT DOCUMENTS

| 4,870,676 | A | * | 9/1989 | Lewo ........................ 455/564 |
| 5,418,836 | A | * | 5/1995 | Yazaki ..................... 455/569.2 |
| 5,485,161 | A | * | 1/1996 | Vaughn .................. 342/357.13 |
| 5,566,224 | A | * | 10/1996 | ul Azam et al. ............. 455/566 |
| 6,018,671 | A | * | 1/2000 | Bremer ........................ 455/567 |
| 6,269,258 | B1 | * | 7/2001 | Peiker ...................... 455/569.2 |
| 6,304,764 | B1 | * | 10/2001 | Pan .......................... 455/569.2 |
| 6,349,222 | B1 | * | 2/2002 | Hafiz ....................... 455/569.2 |
| 6,397,057 | B1 | * | 5/2002 | Malackowski et al. .. 455/414.1 |
| 6,553,308 | B1 | * | 4/2003 | Uhlmann et al. ........... 701/208 |

FOREIGN PATENT DOCUMENTS

JP          10-304464          11/1998

* cited by examiner

Primary Examiner—William Trost
Assistant Examiner—Stephen D'Agosta
(74) Attorney, Agent, or Firm—McDermott, Will & Emery

(57) ABSTRACT

With a mobile telephone (10) set into a telephone holder (11), if a telephone call is received, rather than sounding an audible ringing, a head-up display (60) notifies the driver by a display (67) made in a peripheral vision region (64) outside of a central vision region (63) of the driver. The driver can respond to the incoming call only in the case in which the driving burden on the driver is small enough that, even without the aid of an audible ringing, the driver can notice the received-call display in only the peripheral vision region.

26 Claims, 13 Drawing Sheets

HANDS-FREE TELEPHONE APPARATUS FOR VEHICLES AND CONTROL-METHOD THEREFOR

BACKGROUND OF THE INVENTION

The present invention relates to a hands-free telephone apparatus for vehicles and a control method therefor that allows a telephone conversation without holding a handset by hand.

There has been proposed a fixed mounting of a hands-free telephone in a vehicle to enable hands-free response to an incoming call, with recent widespread use of mobile telephones, there has been proposed in Japanese Patent Application Laid-Open Publication No. 10-304464 a hands-free telephone apparatus in which a mobile telephone is mounted in a vehicle. This hands-free telephone apparatus functions, if the driving burden on the vehicle operator (driver) becomes large or is expected to shortly become large, during a call or while dialing a number, to make notification of that effect, putting the call or dialing on hold.

SUMMARY OF THE INVENTION

With this hands-free telephone apparatus for vehicles, if an output of a sensor or an output of a navigation system is taken as a condition such that an incoming call or dialing should be put on hold when the driving burden is large or expected to shortly become large, then even if the driver feels free enough from the driving task to make or receive a call, it is not certain that the driver will be able to use the telephone. Because the call-holding condition is dependent upon the driver, and the sensor output is not necessarily suited to the driver's ability, it is desirable that a driver be permitted to use the telephone if he or she perceives that the burden of driving is not large.

In driving a vehicle, when the driver is concentrating on looking forward through the front windshield, there are generally a central vision region 62 and peripheral vision regions 64 within a field of vision 100 of the driver, as projected on the front windshield 62 as shown in FIG. 3. The field of view 100, the central vision region 63, and the peripheral vision region 64 are defined as follows.

Referring to FIG. 10, an X-Y-Z orthogonal coordinate system is defined in a vehicle by defining an origin and axis orientations. The origin is fixed to a seating reference point R of a driver, which is established as follows. With a mannequin conforming to ISO 6549-1980 seated in a driver's seat of the vehicle, the location of the mannequin's hip point H is taken as the seating reference point R, with a front-to-back adjustable seat in a rearmost position thereof, a vertically adjustable seat at a lowermost position thereof, or with a seat having an adjustable mounting angle of a seat back and seat cushion at a design reference angle to be a lockable angle after first placing the seat in a free condition, as necessary. An X-axis and a Y-axis are oriented in longitudinal and transverse directions of the vehicle, respectively, and a Z-axis extends in a vertical direction. The driver's seat on which the seating reference point R is established is transversely offset relative to a vehicle center plane S1, and an X-Z plane S2 on which the reference point R resides is likewise offset.

Given the seating reference point R, there are established upper and lower marginal reference points V1 and V2 of vision stricture at rearwardly offset (X=68) two vertical positions (Z=665, Z=589) on a transversely offset (Y=−5) vertical plane S3 parallel to the planes S1 and S2, as in the table below. A front windshield 62 of the vehicle is described relative to the reference point R.

| V points | X (mm) | Y (mm) | Z (mm) |
| --- | --- | --- | --- |
| V1 | 68 | −5 | 665 |
| V2 | 68 | −5 | 589 |

Given the two reference points V1 and V2, there are defined two types of visual zones A and B on the front windshield 62, as follows. First, as shown by a side view in FIG. 11 and by a rear view of a projection in FIGS. 12, there are supposed upper and lower imaginary horizontal planes A1 and A2 extending in the direction of vehicle movement, passing the reference points V1 and V2 on the vertical plane S3 (FIG. 11), respectively, and crossing the front windshield 62 along horizontal curves 2 and 3 (FIGS. 11 and 12), respectively. Then, there is supposed an upper inclined plane B1 inclined by 3° upward from the upper horizontal plane A1, passing the upper reference point V1 on the vertical plane S3 (FIG. 11) and crossing the front windshield 62 along an upper horizontal curve 1 (FIGS. 11 and 12), as well as a lower inclined plane B2 inclined by 1° downward from the lower horizontal plane A2, passing the lower reference point V2 on the vertical plane S3 (FIG. 11) and crossing the front windshield 62 along a lower horizontal curve 4 (FIGS. 11 and 12). Then, an upper spatial zone relative to the upper inclined plane B1 and a lower spatial zone relative to the lower inclined plane B2 are each defined as a vision-restricted zone B, and an intervening spatial zone between the upper and lower inclined planes B1 and B2 is defined as a visible zone A. The zones A and B have their projections on the front windshield 62, which are viewed on the driver's side in FIG. 12.

On the other hand, a driver's field of vision 100 projected onto the front windshield 62 is defined as follows. Using a mannequin conforming to ISO 6549-1980, seated in the driver's seat as described, an eye position E of the driver is defined. As shown by a side view in FIG. 13A and in a section along the windshield 62 in FIG. 13B, the field of vision 100 extends between an upper angle of 60° and a lower angle of 80° with respect to a horizontal plane extending in the direction of vehicle movement, passing the eye position E, and between angles of 100° to the left and right. The outer circumference of the field of vision 100 defines outer margins of peripheral vision regions.

Mapping the zones A and B on the field of vision 100, as shown in FIG. 14, there are established for the driver an upper and a lower peripheral vision region 64 and a central vision region 63 on the front windshield 62, and a blind region 65.

The vision region 63 thus established within the field of vision 100 is a region in which the driver can accurately recognize a display without moving the viewing point when looking forward, and the peripheral vision region 64 is the region in which the presence of something displayed therein can be perceived, but what is displayed cannot be accurately recognized unless the viewing point is shifted to the display position.

The driver, therefore, can immediately recognize something displayed in the central vision region, but when something is displayed in the peripheral vision region does not notice the display if the burden of driving is large, although does notice the display if the burden of driving is not large.

Accordingly, it is an object of the present invention to provide a hands-free telephone apparatus for vehicles and a control method therefor, wherein if a driver is caused to notice an incoming call telephone call indicated at a position removed from the driver's central vision region by a display means, without issuing an audible ringing, the driver is permitted to answer the call because it was taken that the driver was free enough from driving to have noticed the indication of the incoming call.

It is another object of the present invention to provide a hands-free telephone apparatus and a control method therefor, wherein, even if a driver who notices an incoming call displayed at a location removed from the driver's central vision region by a display means answers the call, because driving will present a burden to the driver, if inter-vehicle distance tracking control is being performed the inter-vehicle distance is re-set to a distance longer than the reference inter-vehicle distance usually set, or braking force is controlled so as to enable the driver to drive at ease.

An aspect of the present invention to achieve the object is a hands-free telephone apparatus for vehicles, comprising a telephone holder configured to hold a mobile telephone in a vehicle, a display configured to indicate information, a microphone and a speaker for a hands-free telephone call, an operation inputter, and a communication controller connected to the mobile telephone held in the telephone holder, the communication controller performing an incoming call control to be responsible for a reception of an incoming telephone call at the mobile telephone held in the telephone holder to control the display to indicate the reception, without issuing an audible ringing, for detection of a prescribed operation input from the operation inputter within a prescribed amount of time after the reception, to have a telephone connection established to enable a hands-free call using the microphone and the speaker, and for non-detection of a prescribed operation input from the operation inputter within the prescribed amount of time after the reception, to enter an automatic call response.

According to another aspect of the present invention, there is provided a hands-free telephone apparatus for vehicles, comprising a telephone holder configured to hold a mobile telephone in a vehicle, a display configured to indicate information, a microphone and a speaker for a hands-free telephone call, an operation inputter, and a communication controller connected to the mobile telephone held in the telephone holder, the communication controller performing an incoming call control to be responsible for a reception of an incoming telephone call at the mobile telephone held in the telephone holder to control the display to indicate the reception in a peripheral vision region out of a central vision region of a driver, without issuing an audible ringing.

According to another aspect of the present invention, there is provided a hands-free telephone apparatus for vehicles, comprising a telephone holder configured to hold a mobile telephone in a vehicle, a display configured to indicate information, a microphone and a speaker for a hands-free telephone call, an inter-vehicle distance tracking controller configured to keep an inter-vehicle distance between the vehicle and a preceding vehicle to a reference inter-vehicle distance, an operation inputter, and a communication controller connected to the mobile telephone held in the telephone holder, the communication controller performing an incoming call control to be responsible for a reception of an incoming telephone call at the mobile telephone held in the telephone holder to control the display to indicate the reception, without issuing an audible ringing, and for detection of a prescribed operation input from the operation inputter within a prescribed amount of time after the reception, to have a telephone connection established to enable a hands-free call using the microphone and the speaker, and to make the reference inter-vehicle distance longer.

According to another aspect of the present invention, there is provided a hands-free telephone apparatus for vehicles, comprising a telephone holder configured to hold a mobile telephone in a vehicle, a display configured to indicate information, a microphone and a speaker for a hands-free telephone call, a braking force controller configured to control a braking force of the vehicle to have an inter-vehicle distance between the vehicle and a preceding vehicle matching with a reference inter-vehicle distance depending on a vehicle speed, an operation inputter, and a communication controller connected to the mobile telephone held in the telephone holder, the communication controller performing an incoming call control to be responsible for a reception of an incoming telephone call at the mobile telephone held in the telephone holder to control the display to indicate the reception, without issuing an audible ringing, and for detection of a prescribed operation input from the operation inputter within a prescribed amount of time after the reception, to have a telephone connection established to enable a hands-free call using the microphone and the speaker, and to control the braking force controller to apply a braking force when the inter-vehicle distance is shorter than the reference inter-vehicle distance.

Another aspect of the present invention to achieve the object is a control method for hands-free telephone apparatus for vehicles including a telephone holder configured to hold a mobile telephone in a vehicle, a display configured to indicate information, a microphone and a speaker for a hands-free telephone call, and an operation inputter, the control method comprising responding to a reception of an incoming telephone call at the mobile telephone held in the telephone holder, by controlling the display to indicate the reception, without issuing an audible ringing, responding to detection of a prescribed operation input from the operation inputter within a prescribed amount of time after the reception, by having a telephone connection established to enable a hands-free call using the microphone and the speaker, and responding to non-detection of a prescribed operation input from the operation inputter within the prescribed amount of time after the reception, by entering an automatic call response.

According to another aspect of the present invention, there is provided a control method for a hands-free telephone apparatus for vehicles including a telephone holder configured to hold a mobile telephone in a vehicle, a display configured to indicate information, and a microphone and a speaker for a hands-free telephone call, the control method comprising responding to a reception of an incoming telephone call at the mobile telephone held in the telephone holder, by controlling the display to indicate the reception in a peripheral vision region out of a central vision region of a driver, without issuing an audible ringing.

According to another aspect of the present invention, there is provided a control method for a hands-free telephone apparatus for vehicles including a telephone holder configured to hold a mobile telephone in a vehicle, a display configured to indicate information, a microphone and a speaker for a hands-free telephone call, an inter-vehicle distance tracking controller configured to keep an inter-vehicle distance between the vehicle and a preceding vehicle to a reference inter-vehicle distance, and an operation inputter, the control method comprising responding to a reception of an incoming telephone call at the mobile telephone held in the telephone holder, by controlling the display to indicate the reception, without issuing an audible ringing, and responding to detection of a prescribed operation input from the operation inputter within a prescribed amount of time after the reception, by having a telephone connection established to enable a hands-free call using the microphone and the speaker, and by making the reference inter-vehicle distance longer.

According to another aspect of the present invention, there is provided a control method for a hands-free telephone apparatus for vehicles including a telephone holder configured to hold a mobile telephone in a vehicle, a display configured to indicate information, a microphone and a speaker for a hands-free telephone call, a braking force controller configured to control a braking force of the vehicle to have an inter-vehicle distance between the vehicle and a preceding vehicle matching with a reference inter-vehicle distance depending on a vehicle speed, and an operation inputter, the control method comprising responding to a reception of an incoming telephone call at the mobile telephone held in the telephone holder, by controlling the display to indicate the reception, without issuing an audible ringing, and responding to detection of a prescribed operation input from the operation inputter within a prescribed amount of time after the reception, by having a telephone connection established to enable a hands-free call using the microphone and the speaker, and by controlling the braking force controller to apply a first braking force when the inter-vehicle distance is shorter than the reference inter-vehicle distance.

BRIEF DESCRIPTION OF THE DRAWING

The above and other features will be better understood from the exemplary embodiments described below, taken together with the drawings, in which.

DETAILED DESCRIPTION OF THE PREFERRED EMBODIMENTS

Embodiments of the present invention are described in detail below, with references being made to relevant accompanying drawings.

Figure 1:
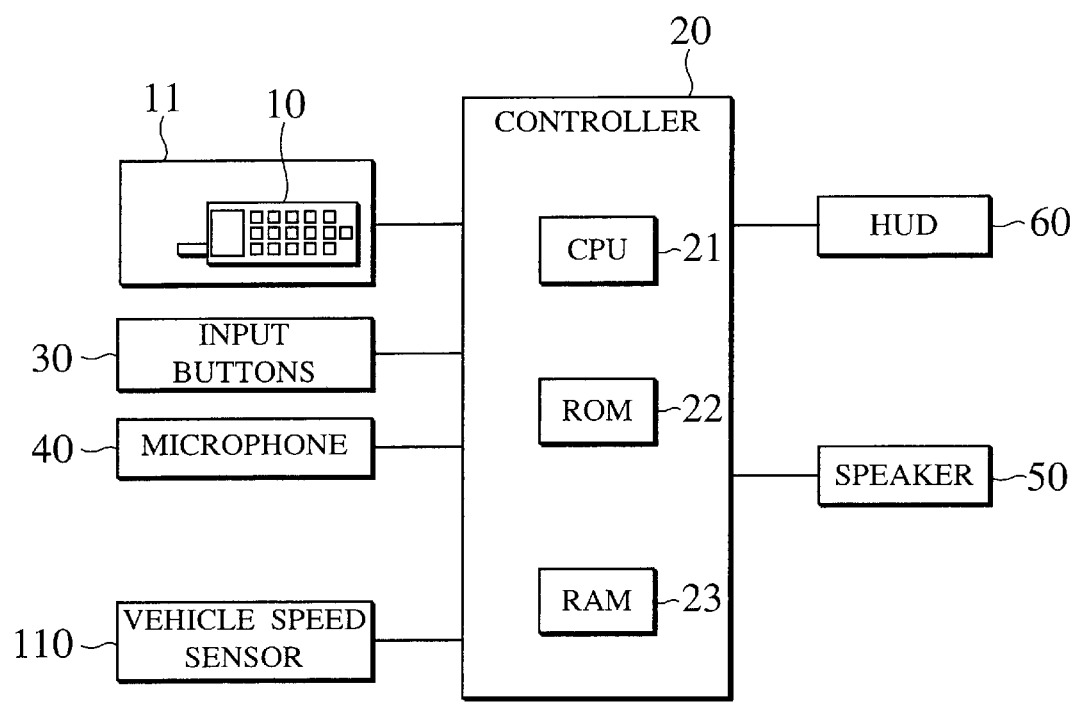
FIG. 1 is a block diagram showing a configuration of a first embodiment of the present invention.

FIG. 1 shows a configuration of a hands-free telephone apparatus for vehicles according to an embodiment of the present invention. For example, a mobile telephone 10 such as a vehicle phone or handheld telephone is set into and held by a telephone holder 11. The telephone holder 11 is connected to a communication controller 20, and when the mobile telephone 10 is set into the telephone holder 11, it is possible to control the mobile telephone 10 from the controller 20.

Input buttons 30, a microphone 40, a speaker 50, a head-up display (HUD) 60, a vehicle speed sensor 110, and a laser radar 160 are connected to the controller 20, which performs overall control of these elements.

When a call is received by the mobile telephone, an operation of a call start button (not shown in the drawing) of the input buttons 30 causes connection of the mobile telephone to the communication line (radio circuit), enabling a hands-free call to be made using the microphone 40 and the speaker 50.

Figure 3:
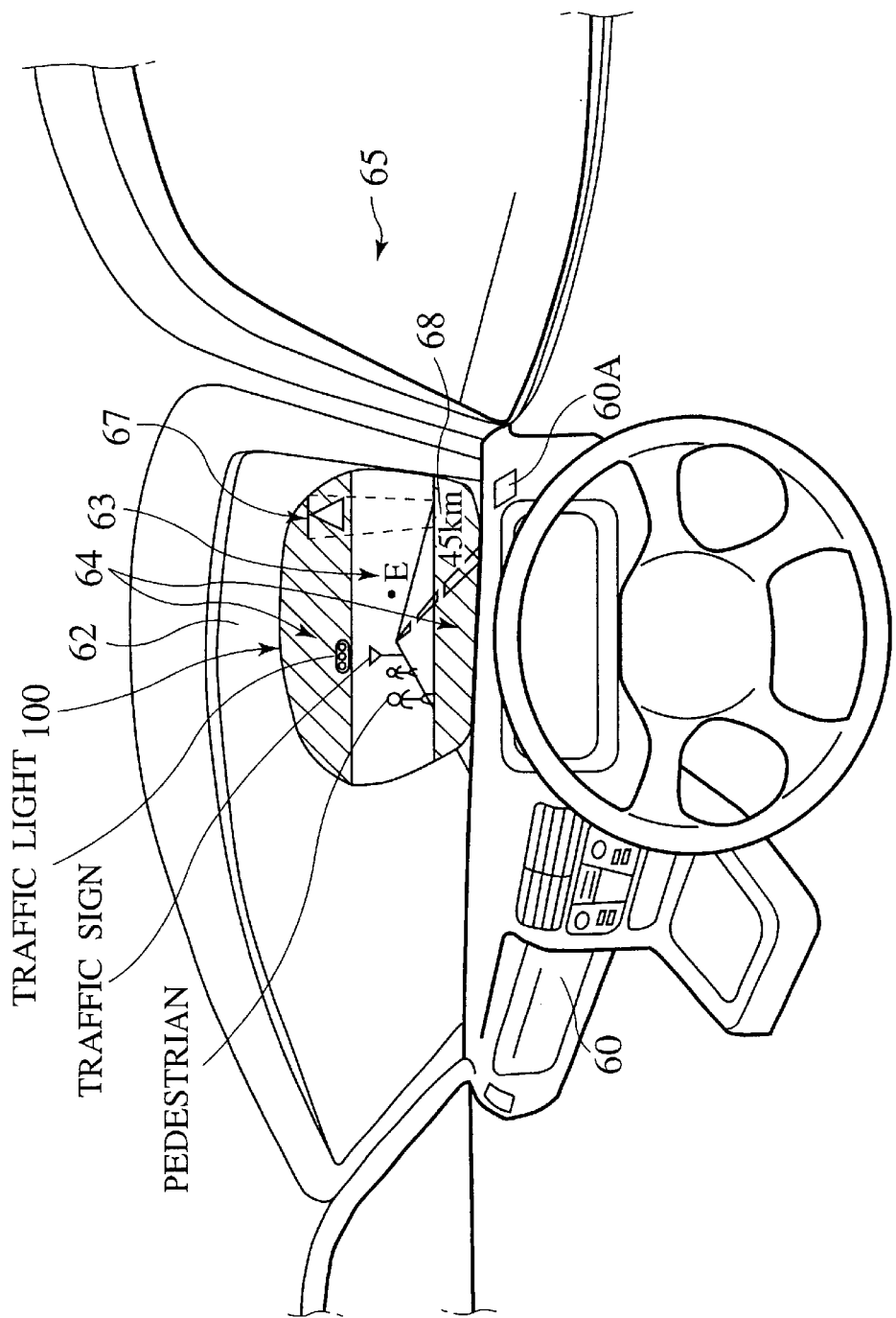
FIG. 3 is a drawing illustrating the position of the incoming call display according to the embodiment of FIG. 1.

As shown in FIG. 3, the HUD 60 has a transparent screen incorporated in a front windshield 62, to be disposed in front of an instrument panel of the vehicle. The instrument panel has a projector (not shown) installed therein for projecting a beam of picture light through an opening 60A formed in the instrument panel, to have a visible picture developed on the screen. The HUD 60 is adapted to display an icon 67 indicating a reception of a call, a telephone number indicating the number from which a call is received, and a name, title, or abbreviation associated in the mobile telephone with the telephone number when such has been programmed into the mobile telephone. Details of the display are presented later.

The controller 20 has an incoming call detection function for detecting an call received by the mobile telephone 10, a message sending function for sending a response priorly recorded message that provides an automatic response to a received call or a response message which prompts the caller to leave a message, and a recording/playback function for recording and playing back a message from a caller, and a telephone number storage function for detecting and storing the telephone number of a received call and recalling and dialing a telephone number. The controller 20 has a CPU 21, a ROM 22, and a RAM 23 for storing a program and data required for these functions and performing the required processing.

Figure 2:
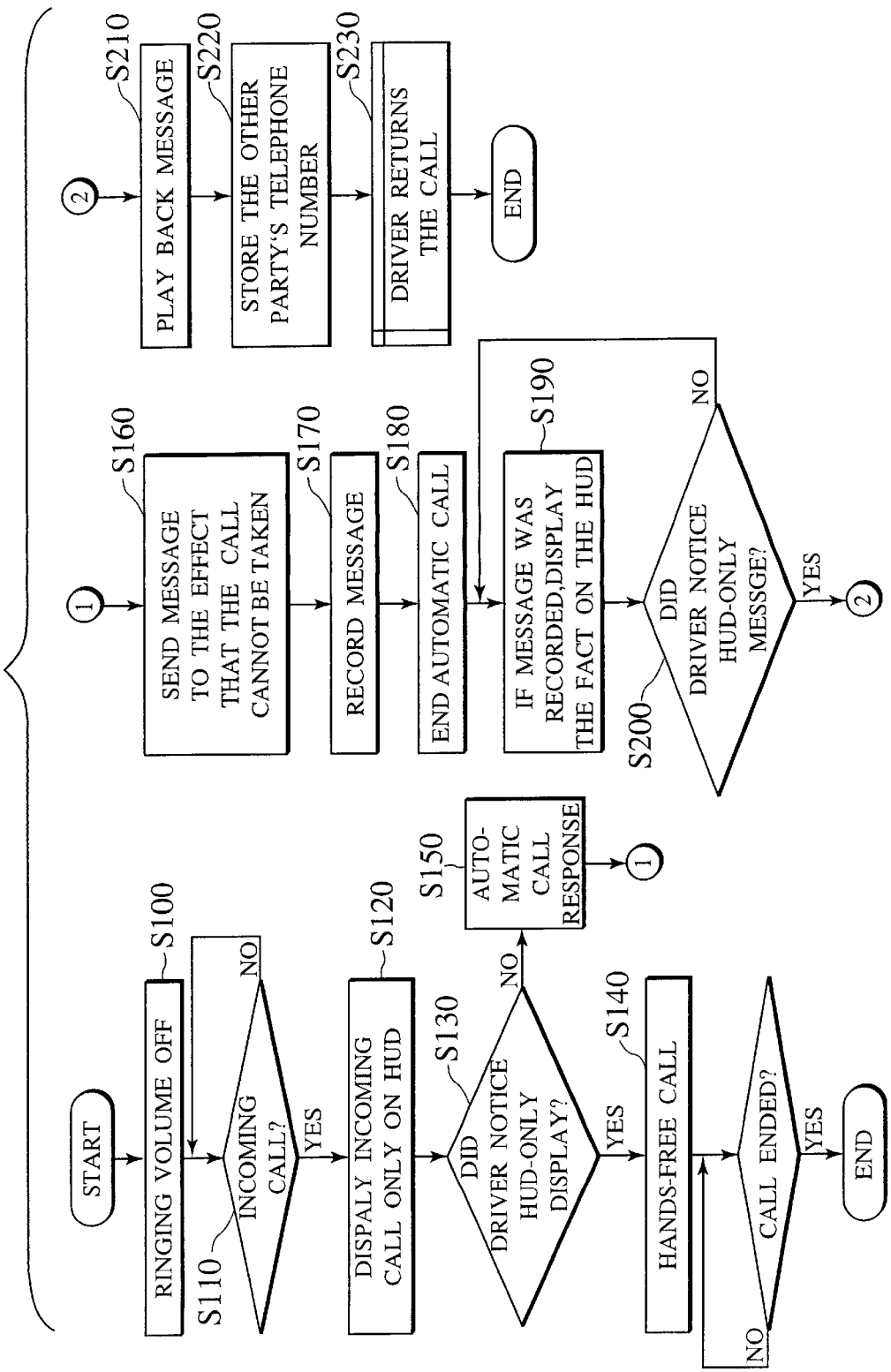
FIG. 2 is a flowchart of processing an incoming call according to the embodiment of FIG. 1.

The operation of a hands-free telephone apparatus for vehicles configured as noted above is as follows. FIG. 2 is a flowchart showing the communication control function of this telephone apparatus. With the mobile telephone 10 set into the telephone holder 11, an automatic connection is made with the controller 20, so that signal transfer is performed.

When the mobile telephone 10 is set into the telephone holder 11, the ringing sound is set to off (minimum volume), and the telephone goes into the wait-for-call condition (step S100). If a call is received (step S110), the controller 20 displays the received call simply on the HUD 60 (step S120), and appears in the condition such as shown in FIG. 3 when the call is received.

FIG. 3 shows the relationship between the windshield 56, in which the HUD 60 displays the required information, and the forward field of view of the driver while driving. To the driver concentrating his or her vision toward the front, there is a central vision region 63, a peripheral vision region 64 at the periphery of the central vision region 63, and a region 65 that is not visible to the driver. The difference between the central vision region 63 and the peripheral vision region 64 is that, as the burden on the driver of driving increases, the peripheral vision region 64 becomes extremely narrow. Therefore, when the controller 20 causes display of the received-call icon 67 indicating an incoming call, even if the burden of driving is large, the driver notices the received-call icon 67, but if the received-call icon 67 is displayed in the peripheral vision region 64, the driver does not notice the received-call icon 67 when the burden of driving is large.

Given the above, when a call is received, the ringing sound is not generated, and the received-call icon 67 is displayed in the peripheral vision region. If the received-call icon 67 is displayed in the peripheral vision region 64 in this manner, in a condition in which the driving burden on the driver is large and the driver must concentrate his or her attention on driving, the driver does not notice the received-call icon 67 and does not answer the call. If, however, the driver is free enough from the burden of driving to notice the received-call icon 67 in the peripheral vision region 64, the received-call icon 67 is noticed, and the driver can answer the telephone call. The HUD 60 can also display the vehicle speed, and when the vehicle speed indicator 68 is indicating the speed, it is desirable that the received-call icon 67 be displayed in a location different from the location of the vehicle speed indicator.

If the driver notices the received-call icon 67 and answers the received call, a hands-free call can be made by operating the call-starting button of the input buttons 30 (steps S130 and S140). If, however, the driver is not sufficiently free from the burden of driving and does not notice the display of the received-call icon for a prescribed amount of time a switch is made to automatic response to the incoming call (step S150).

In the automatic call-response mode, the answering machine function is activated, and the controller 20 utilizes its message sending function to send a message indicating that the driver cannot answer the call (step S160), and utilizes its recording/playback function to record a message from the caller (step S170). If the caller hangs up, the automatic call-receiving processing ends (step S180), at which point in time an icon indicating that a message has been recorded is displayed in the same position on the HUD 60 as the received-call icon 67 (step S190).

If the driver notices this message-recorded icon and operates a playback switch of the input buttons 30, a recording/playback section 90 plays back the recorded message, which is output from a speaker 50 (steps S200 and S210). In parallel with the recording of the incoming message, the telephone number of the caller is stored by the telephone number storage function (step S220). Thus, the driver can play back the recorded message and, if necessary, can call back the caller at the recorded telephone number (step S230). Although the flowchart shows the case in which the telephone number of a received call is stored at step S220, there is no particular restriction presented with respect to the sequence of processing, and it is alternately possible to perform the storage of the telephone number simultaneously with the detection of the incoming call, at step S120, or at step S150, at which automatic call response processing is performed.

In a hands-free telephone apparatus according to a first embodiment of the present invention, with the mobile telephone 10 set into the telephone holder 11 of a vehicle, if a call is received, rather than audibly sounding the call, a display is only made on the HUD 60 and, if a prescribed amount of time elapses without someone responding to the call, an automatic switch is made to automatic call response processing. By doing this, when the burden of driving on the driver is great enough that the driver does not notice the received-call display, the driver is allowed to drive without being started by the received call and without needing to be concerned with whether or not a call has been received.

Furthermore, by placing the received-call display in the peripheral vision region 64, which is outside the central vision region 63 of the driver, only in the case in which the burden of driving is low enough that the driver, even without an audible ring, notices the received-call display displayed only in the peripheral vision region can the driver actually respond to call received on the mobile telephone.

By switching to automatic call response processing if a prescribed amount of time elapses after receipt of a call without a response thereto, it is possible to perform voice recording of a message in the case in which the burden of driving is so great that the driver does not notice the received-call display, thereby permitting the driver to drive in comfort, without having to be concerned about the received-call display.

Additionally, by displaying a "message-recorded" icon in the driver's peripheral vision region of the HUD 60 when a message has been recorded, only when the burden of driving is small enough that the driver is free to notice the messaged-recorded icon will the driver be able to play back the recorded message, but when the driving burden is so great that the driver does not notice the message-recorded icon the driver does not play back the message, thereby preventing interference with the operation of the vehicle by the driver.

In addition to the above, by automatically storing the telephone number of the caller of an incoming call, even if the driver is not free from driving duties, and does not notice the received-call icon, it is possible to call the caller back later, enabling the driver to drive at ease, without having to be concerned as to whether or not a call has been received, or to be concerned with answering incoming calls.

In the first embodiment, it is possible to connect a vehicle speed sensor 110 such as shown in FIG. 1 to the controller 20 and to add a function thereto which, when a received-call icon 67 is displayed in the peripheral vision region 64 of the driver, displays the icon at a location that is brought closer to the central vision region 63 as the speed increases. The reason for doing this is as follows.

Because the driver's peripheral vision region becomes narrow with an increase in the speed of the vehicle, if the display location of the received-call icon 67 is fixed in the peripheral vision region, as the vehicle speed increases the icon falls outside the peripheral vision region 64, falling instead into the region 65, which is not visible to the driver, so that the driver is completely unaware that a call has been received. It is desirable, however, when the driver is free enough from the burden of driving to perceive the peripheral vision region, so that the driver can notice the received-call icon 67 displayed in the peripheral vision region 64 to indicate an incoming call without the aid of an audible ringing, the driver is able to respond to the call.

A second embodiment of a hands-free telephone apparatus according to the present invention is described below, with reference being made to FIG. 4 and FIG. 5. A feature of the second embodiment is that, when a telephone call is received with the mobile telephone 10 set into the telephone holder 11, if the driver notices the received-call display without the aid of an audible ring and performs start of the call using the input buttons 30, the controller 20 serving as an operating assistant sets an inter-vehicle distance that is greater than the usual distance.

Figure 4:
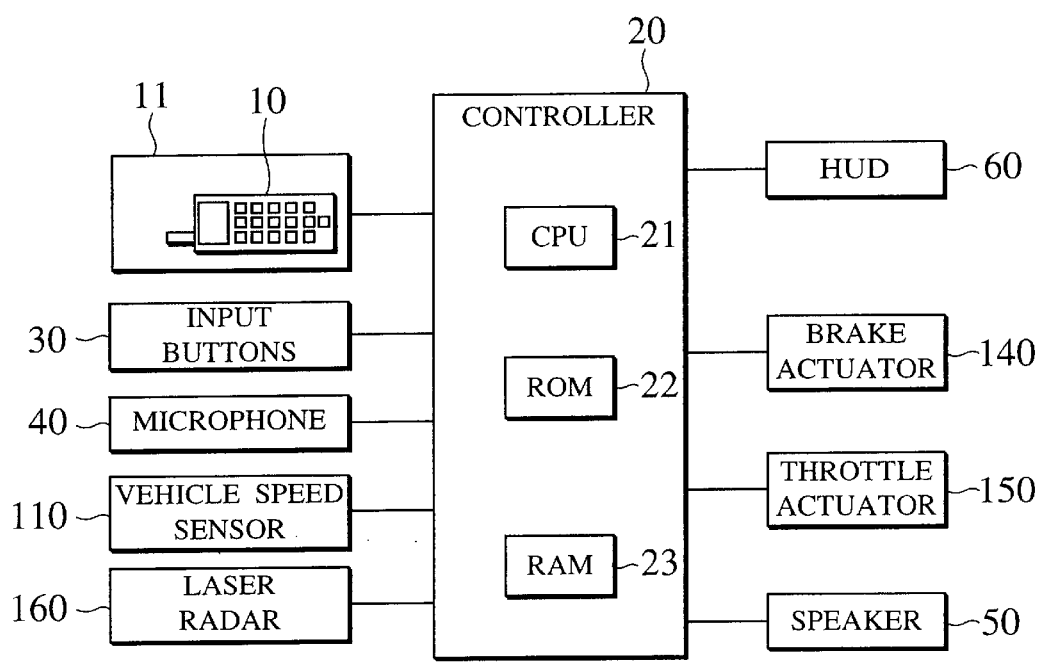
FIG. 4 is a block diagram showing the configuration of a second embodiment of the present invention.
Figure 5:
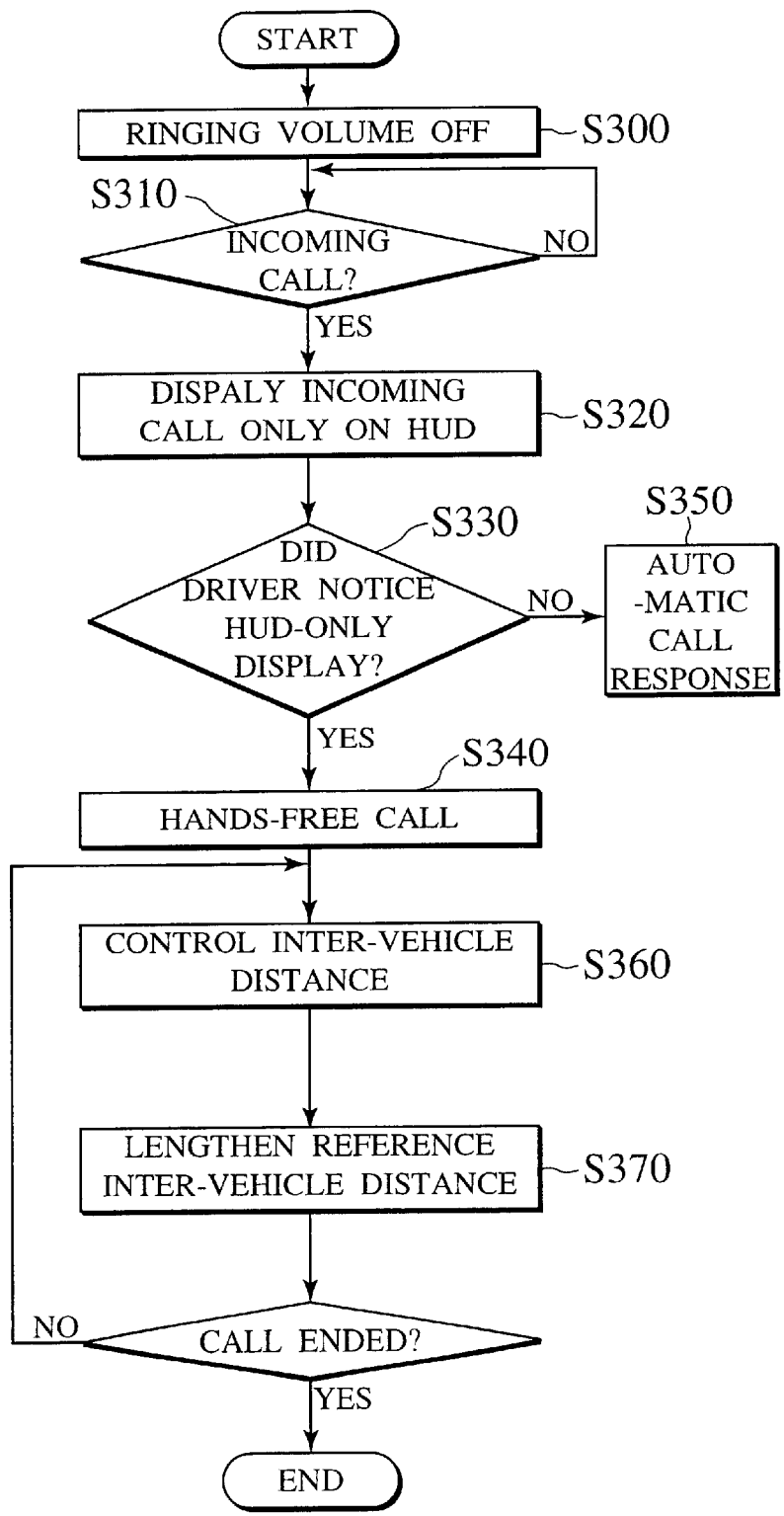
FIG. 5 is a flowchart of processing an incoming call according to the embodiment of FIG. 4.

As shown in FIG. 4, in the hands-free telephone for a vehicle according to the second embodiment, similar to the first embodiment, the mobile telephone 10 is held in place in the telephone holder 11. The telephone holder 11 is connected to the controller 20 and when the mobile telephone 10 is set thereinto, enables control of the mobile telephone 10 from the controller 20.

Similar to the case of the first embodiment, input buttons 30, a microphone 40, a speaker 50, and an HUD 60 are connected to the controller 20. In addition, in the second embodiment, a brake actuator 140, a throttle actuator 150, and a laser radar apparatus 160 for measuring inter-vehicle distance to enable inter-vehicle distance tracking control are connected to the controller 20 to enable control thereof.

The inter-vehicle distance tracking control function of the controller 20 measures the distance to a a preceding vehicle, using the laser radar apparatus 160, and performs control of the brake actuator 140 and the throttle actuator 150 so that this distance corresponds to a pre-established inter-vehicle distance with respect the vehicle speed output by the vehicle speed sensor 110, thereby controlling a braking force and a drive force (not shown in the drawing).

The operation of a hands-free telephone apparatus for vehicles according to the second embodiment is described below, with reference made to the flowchart of FIG. 5. When the mobile telephone 10 is set into the telephone holder 11, a signal from the controller 20 sets the ringing volume to off (minimum volume), so that it is not heard by the driver, the waiting condition continuing until a call is received (steps S300 and S310).

If a call is received, this event is indicated by characters or an icon on the HUD 60. This display by the HUD 60, in the same manner as in the first embodiment, can be made in the driver's peripheral vision region, and can alternately be made on a fixed liquid-crystal display or CRT display screen.

With the received-call display, if a prescribed amount of time elapses without the driver operating an input button 30 to start the call, a switch is made to automatic incoming call response, similar to the case of the first embodiment, in which either incoming message recording processing is performed, or a fixed message such as "I am driving right now and cannot answer your call" is sent and the telephone number of the caller is stored, thereby ending the call (step S350). In the second embodiment as well, a function required to operate the automatic call response function is incorporated as a program into the controller 20.

If the driver notices the received-call display and performs an operation to start the call, using an input button 30, a transition is made to a hands-free call (steps S330 and S340), and the controller 20 performs inter-vehicle distance tracking control. That is, if inter-vehicle distance tracking was already being performed, it is continued, but if inter-vehicle distance tracking control was not being performed, this tracking control is forcibly enabled (step S360).

With this inter-vehicle distance tracking control, a standard inter-vehicle distance is set in accordance with the vehicle speed measured by the vehicle speed sensor 110. When a signal indicating a call in progress is received from the controller 20, however, the usual standard inter-vehicle distance D is multiplied by a prescribed coefficient k, so that the inter-vehicle distance is set to a distance k·D, which is longer than the usual inter-vehicle distance (step S370). For example, if the standard inter-vehicle distance is 25 meters at a vehicle speed of 50 km/h, this can be multiplied by a k value of 1.2, thereby obtaining a new inter-vehicle distance of 30 meters. It will be readily understood that the value of k is not limited, however, to 1.2.

Thus, if the driver notices the received-call display without the aid of an audible ringing sound and starts a call, the inter-vehicle distance tracking function, which is a type of driving assistant, is forcibly started, and the associated inter-vehicle distance is set to a value so that the distance to a a preceding vehicle is maintained as longer than the usual standardly set inter-vehicle distance. If the inter-vehicle distance tracking control had already been enabled, the inter-vehicle distance is reset so as to increase the inter-vehicle distance from the standard inter-vehicle distance, thereby lowering the burden of driving placed on the driver while responding to an incoming call.

A third embodiment of a hands-free telephone apparatus for vehicles according to the present invention is described below, with reference made to FIG. 6 and FIG. 7.

Figure 6:
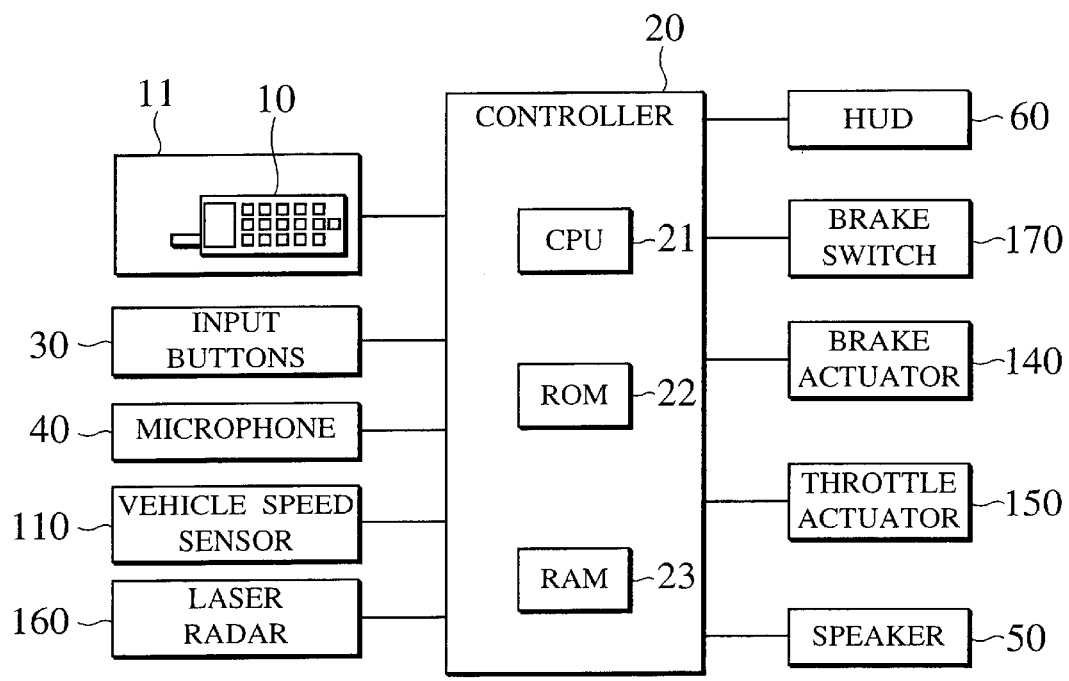
FIG. 6 is a block diagram showing the configuration of a third embodiment of the present invention.
Figure 7:
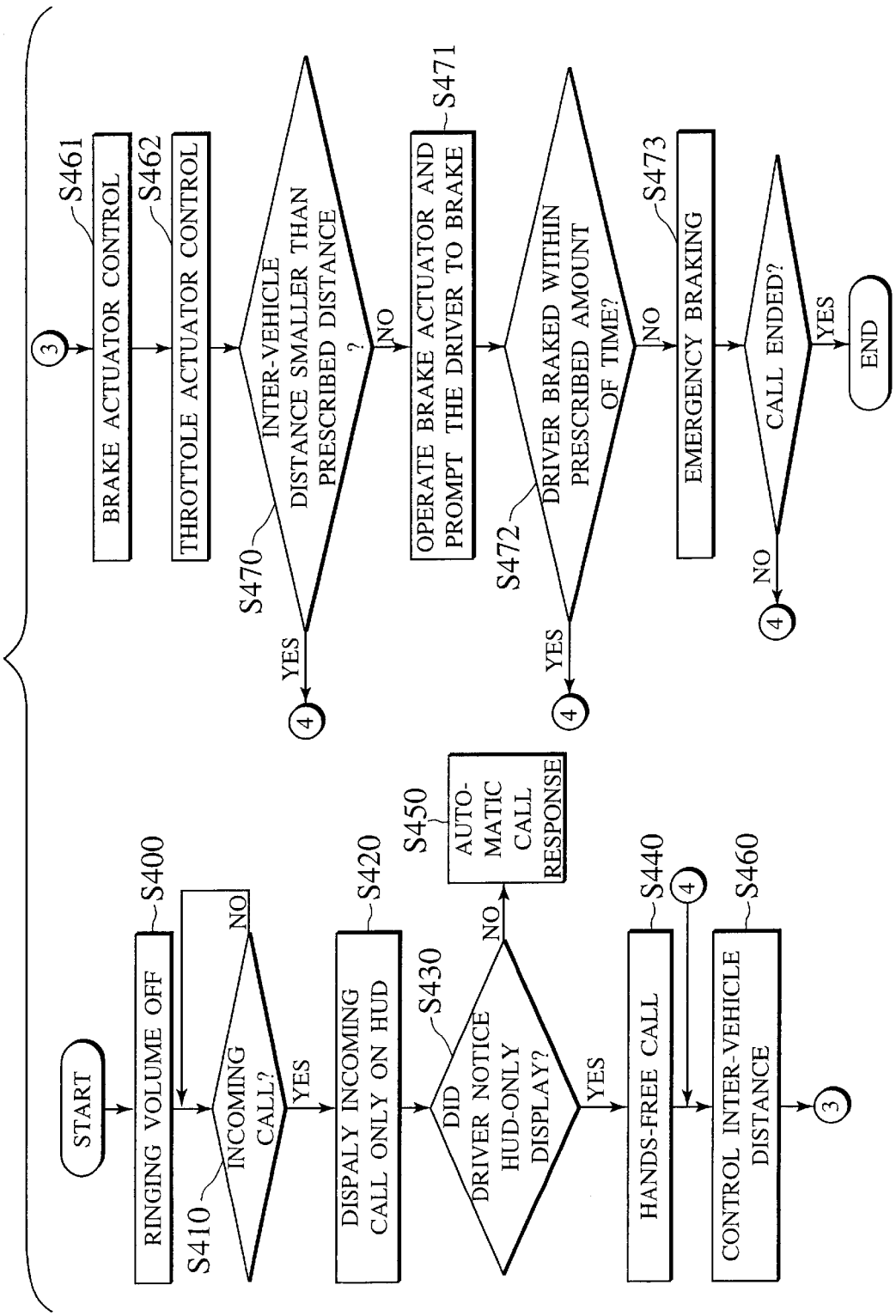
FIG. 7 is a flowchart of processing an incoming call according to the third embodiment shown in FIG. 6.

With the exception of the addition of a brake switch 170 to the controller 20, the configuration of the third embodiment shown in FIG. 6 is the same as the configuration of the second embodiment shown in FIG. 4.

The brake switch 170 goes into the on condition when the driver depresses the brake pedal strong or makes a sudden braking operation.

The operation of a hands-free telephone apparatus for vehicles according to the third embodiment is described below, with reference to the flowchart of FIG. 7. When the mobile telephone 10 is set into the telephone holder 11, a signal from the controller 20 sets the ringing volume to minimum, so that it is not audible to the driver, the waiting condition continuing until a call is received (steps S400 and S410).

If a call is received, this event is indicated by characters or an icon on the HUD 60. This display by the HUD 60, in the same manner as in the first embodiment, can be made in the driver's peripheral vision region, and can alternately be made on a fixed liquid-crystal display or CRT display screen.

With the received-call display, if a prescribed amount of time elapses without the driver operating an input button 30 to start the call, a switch is made to automatic incoming call response, similar to the case of the first embodiment, in which either incoming message recording processing is performed, or a fixed message is sent and the telephone number of the caller is stored, thereby ending the call (step S450). In the third embodiment as well, constituent elements are incorporated into the controller 20.

If the driver notices the received-call display and performs an operation to start the call, using an input button 30, a transition is made to a hands-free call (steps S430 and S440), and the controller 20 performs inter-vehicle distance tracking control, whereby the brake actuator 140 and the throttle actuator 150 are controlled so as to achieve an inter-vehicle distance in accordance with the distance to a a preceding vehicle that is detected by the laser radar apparatus 160 (steps 460 to 462).

A judgment is made as to whether the detected distance is the same or smaller than a pre-established standard inter-vehicle distance (step S470) and, if it is below the standard inter-vehicle distance (YES result), the control of steps S460 to S462 is repeated, but if the distance is greater than the standard inter-vehicle distance, branching is done to NO, from which the processing of step S471 is performed.

At step S471, a light braking force for slight deceleration is made by the brake actuator 140, and the driver is prompted by the HUD 60 to brake. A judgment is made as to whether or not an input indicating brake pedal depression is received from a brake switch 170 within a pre-established amount of time (step S472)

If there is an input from the brake switch 170 within the pre-established amount of time (YES result at step S472), return is made to the inter-vehicle distance tracking control of step S460. If, however, there is no input, branching is done to NO, from which, sudden braking is done to effect a strong deceleration, by means of the braking actuator 140 (step S473).

In this manner, if the driver notices the received-call display alone, without the aid of an audible ringing and starts the call, inter-vehicle distance tracking control is performed, and braking is forcibly applied, based on the inter-vehicle distance, so as to lighten the driven burden on the driver when the driver responds to an incoming telephone call.

A fourth embodiment of a hands-free telephone apparatus for vehicles according to the present invention is described below, with reference made to FIG. 1, FIG. 8, and FIG. 9. A feature of the fourth embodiment is that a driver is notified of an incoming call by a display only, without the aid of an audible ringing sound, and when the driver does not respond within a prescribed amount of time, a message recording function is operated to perform digital recording, a summary thereof being automatically generated, an audio version of the summary of the message being fed to the driver upon direction to perform playback. Thus, with a hands-free telephone apparatus according to the fourth embodiment, the controller 20 has a recording/playback function shown in the flowchart of FIG. 8. Other functions are the same as the first embodiment shown in FIG. 1.

Figure 8:
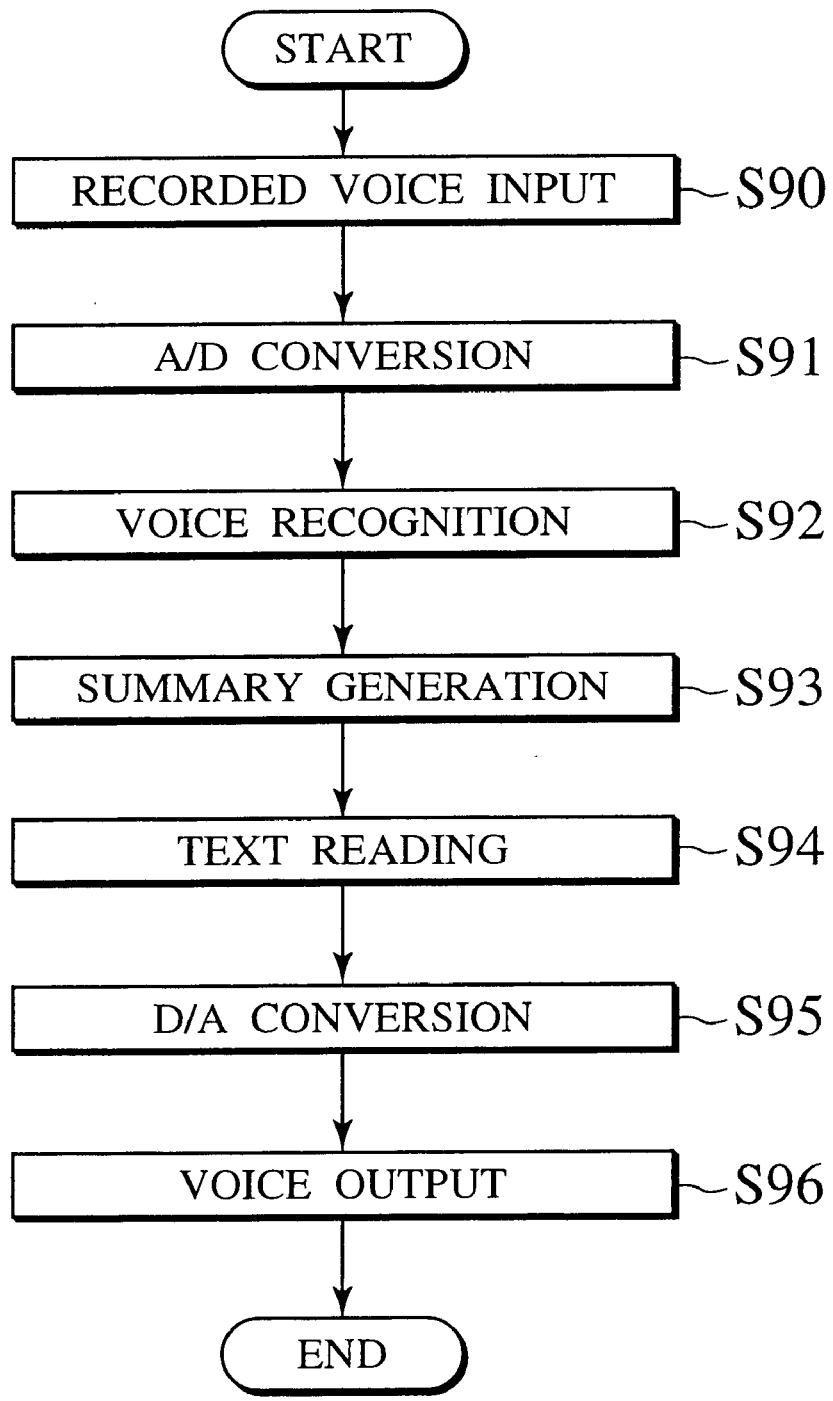
FIG. 8 is a flowchart showing recording and playback processing according to the fourth embodiment.
Figure 9:
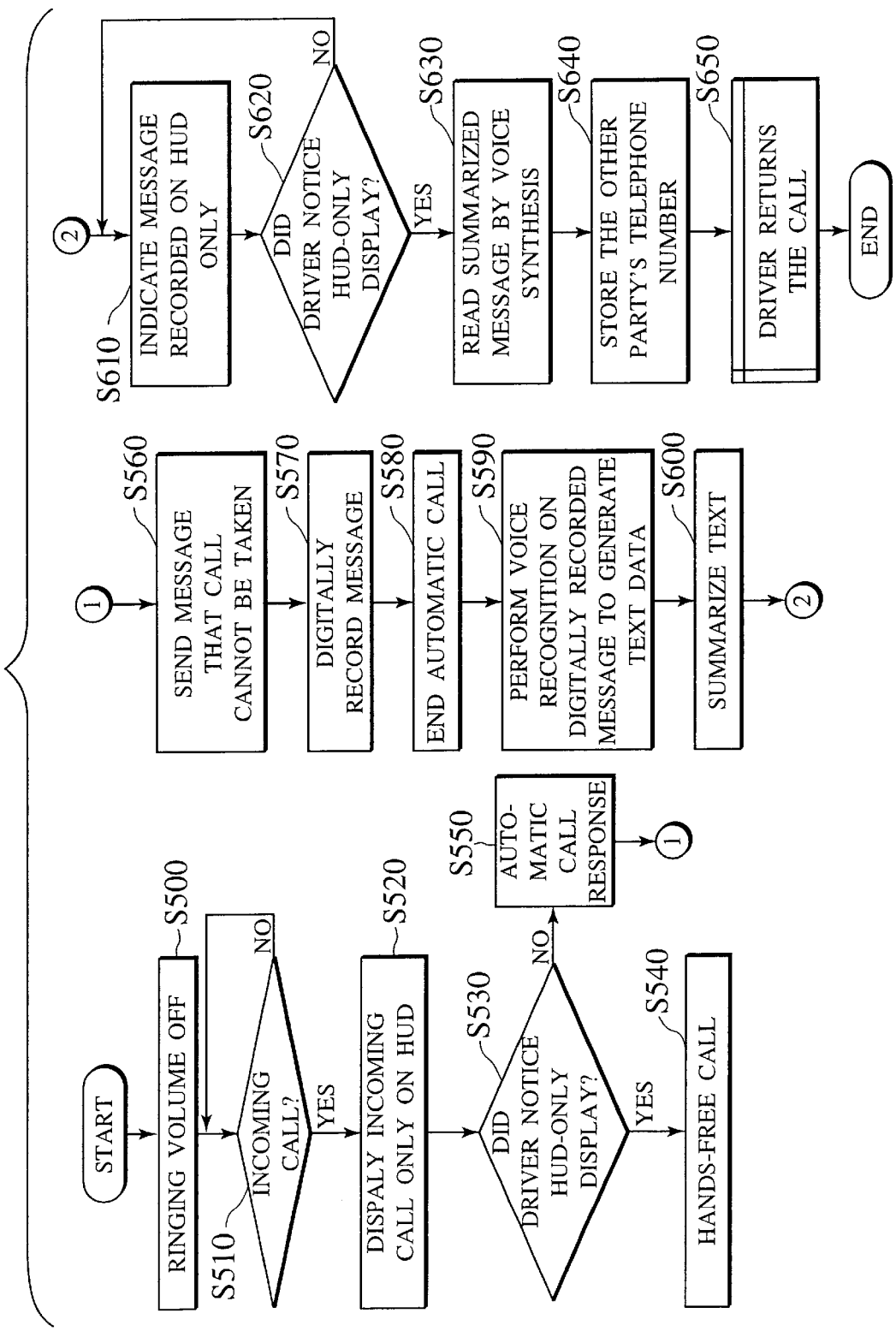
FIG. 9 is a flowchart of processing an incoming call in the embodiment of FIG. 8.
Figure 10:
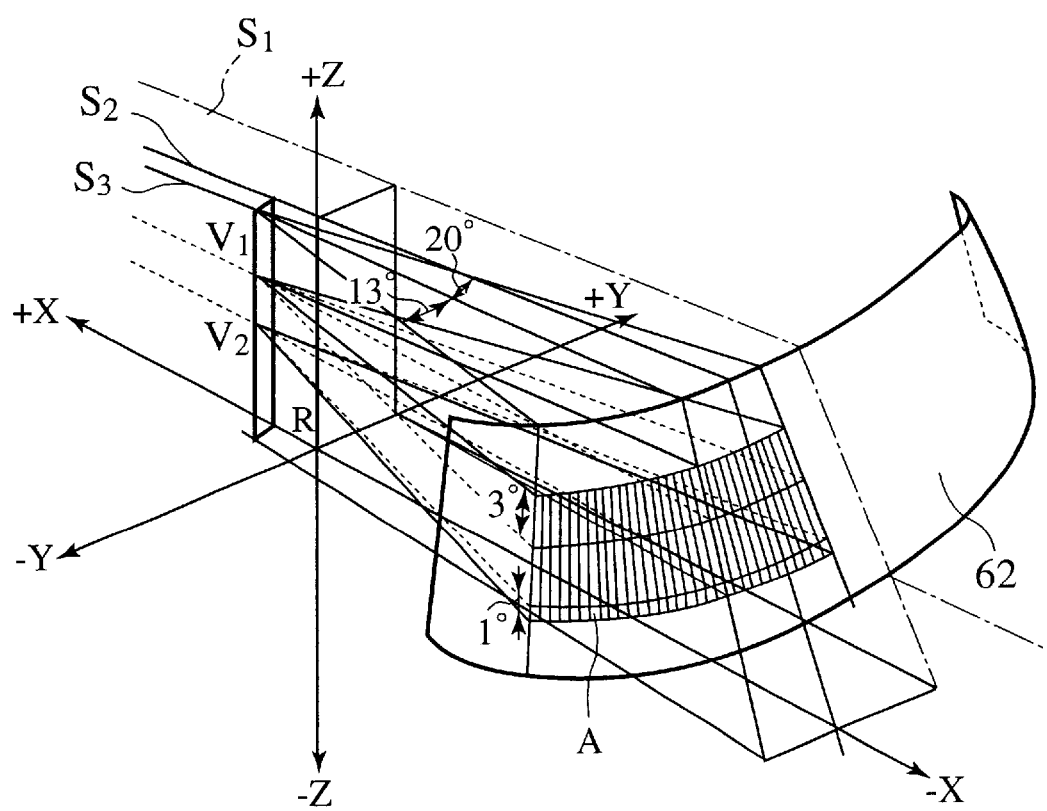
FIG. 10 is a drawing showing the driver's field of vision relative to the vehicle.
Figure 11:
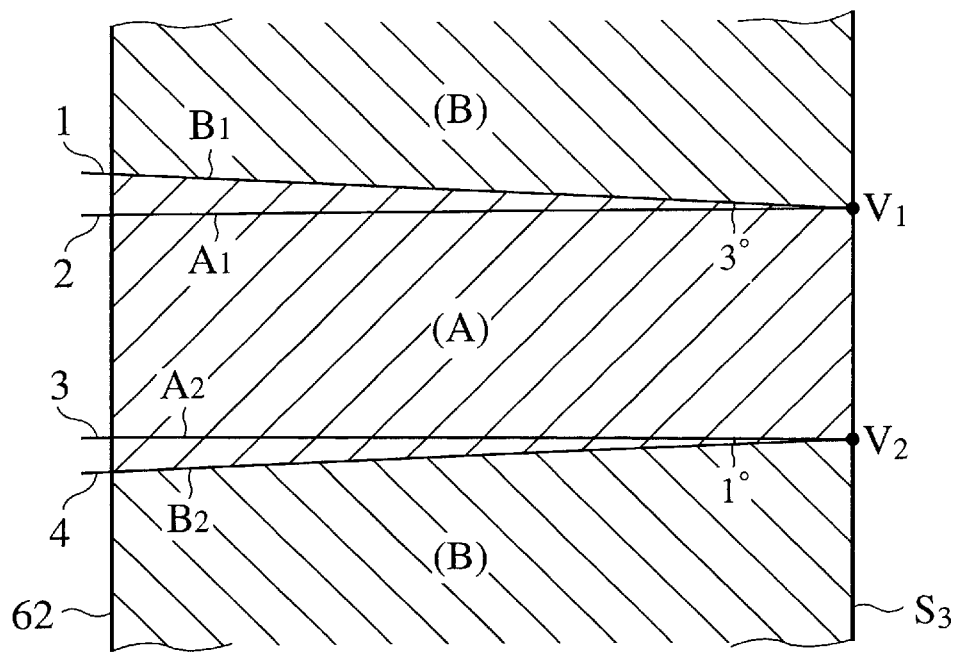
FIG. 11 is a drawing showing the angular relationships of the zones of vision, viewed from the side of the vehicle.
Figure 12:
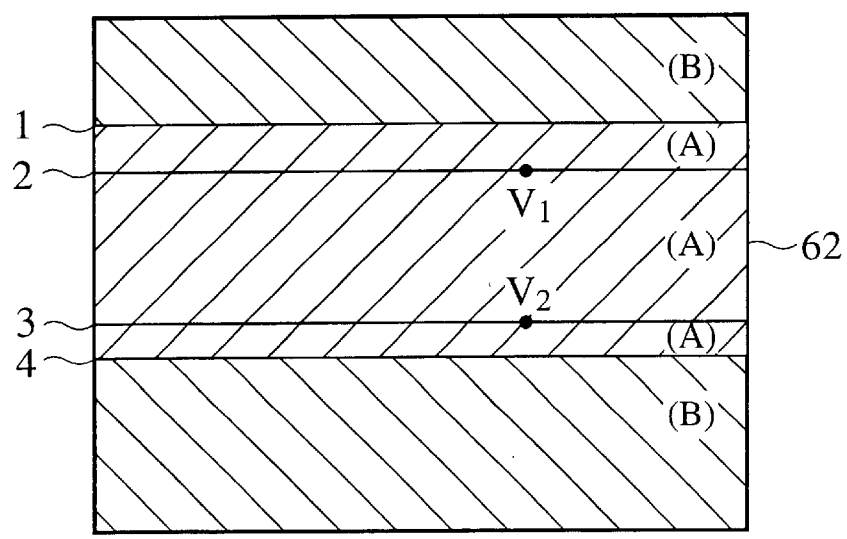
FIG. 12 is a drawing showing the zones of vision as projected onto the front windshield.
Figure 13A:
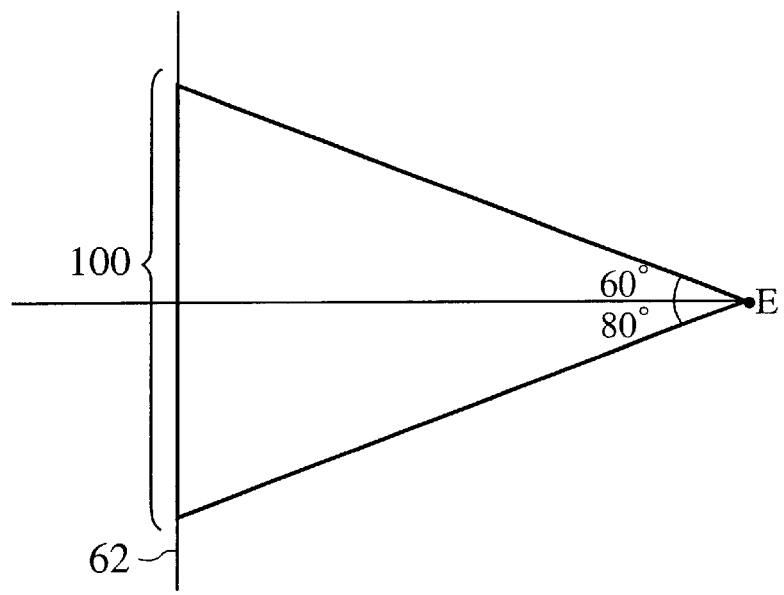
FIG. 13A and FIG. 13B are side and sections views showing the zones of vision relative to the eye point.
Figure 13B:
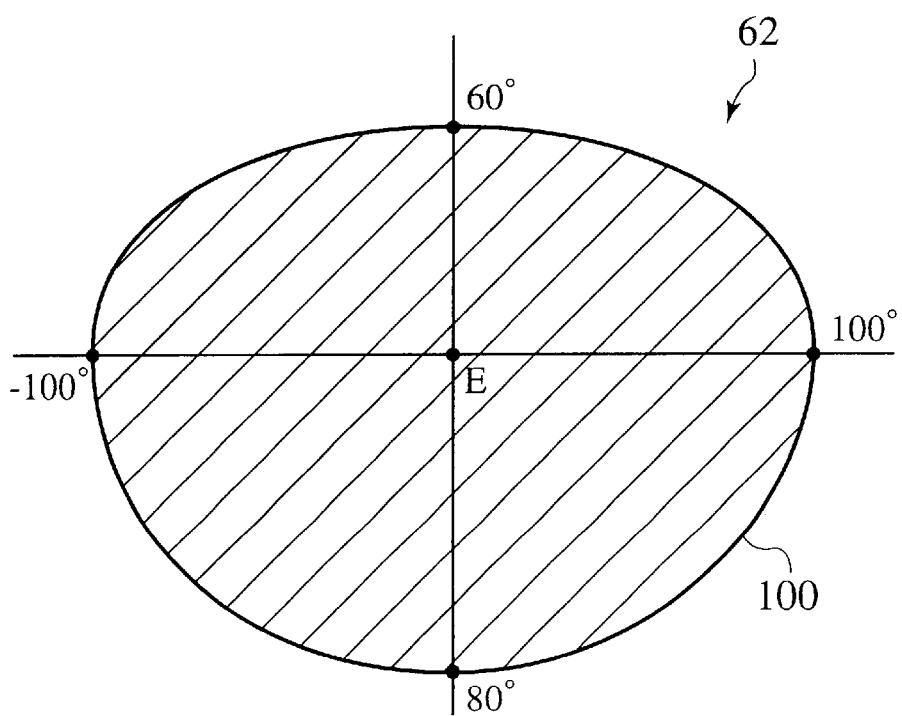
Figure 14:
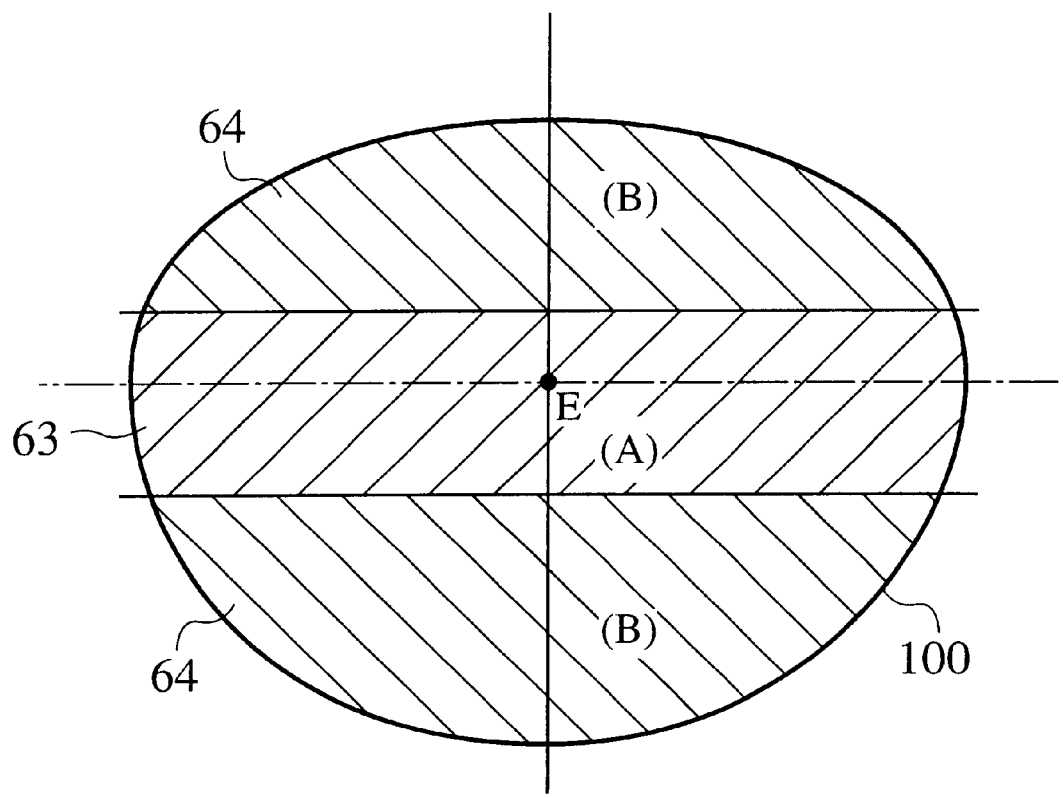
FIG. 14 is a drawing showing the driver's field of vision projected onto the front windshield.

As shown in FIG. 8, the recording/playback function of the controller 20 is as follows. An analog voice signal of the caller that records a message during an incoming call received by the mobile telephone 10 is converted to a digital voice signal by an A/D conversion (steps S90 and S91). Voice recognition is done of this digital voice signal to convert it to text data (step S92), the voice-recognized text data being used to generate a summary text, using a method that is widely used, for example, in wordprocessing applications in the past (step S93). If a command to play back a recorded message is received from an input button 30 via the controller 20, speech synthesis technology is used to create voice data to be read off (step S94), this being D/A converted and output from the speaker 50 as an analog voice signal (steps S95 and S96).

The operation of a hands-free telephone apparatus for vehicles having a automatic summary generation function according to the fourth embodiment is as follows, making reference to the flowchart of FIG. 9. Similar to the case of the first embodiment, with the mobile telephone 10 set into the telephone holder 11, the ringing volume is set to off, and incoming call wait condition is enabled (step S500). If a call is received (step S510), rather than sounding a audible ring, a received-call display is made on the HUD 60 (step S520). The received-call display on the HUD 60 is the same as in the first embodiment, this being located in the driver's peripheral vision region 64. In this embodiment, however, there is no particular restriction on the location of the received-call display, and this can be made on a liquid-crystal display or CRT display screen usually installed in the instrument panel.

If the driver notices this received-call display and performs a call starting operation using an input button 30, it is possible to make a hands-free call (steps S530 and S540).

With the received-call display made, if the driving burden on the driver is large, so that the driver does not notice the received-call display for a prescribed amount of time, a transition to automatic call response is made (step S550). In the automatic incoming call response mode, a message recording function is operated, a message indicating to the caller that the driver cannot take the call is sent (step S560), and the message from the caller is digitally recorded (step S570).

When the caller hangs up, the automatic call response processing is ended (step S580). Thereafter, the recording/playback function performs voice recognition on the digital recording to generate text data (step S590), and a summary is generated from this text data (step S600). In the same manner as the received-call display by the HUD 60, a display is made that a message has been recorded (step S610).

If the driver notices the message-recorded display, and operates a playback switch of the input buttons 30, speech is synthesized from the summary text, D/A converted to an analog voice signal, and output from the speaker 50 as a message summary (steps S620 and S630).

In parallel with the recorded message processing, the controller 20 stores the telephone number of the caller (step S640), although there is no particular restriction presented to the timing of the storage of the telephone number, which can be done simultaneously with the detection of the incoming call, at step S520, or at step S550, at which automatic call response processing is performed.

Thus the driver is able to hear an automatically generated summary of a message left by a caller. If necessary, the driver can recall the number of the caller to return the call (step S650).

Thus, in a hands-free telephone apparatus for vehicles according to the fourth embodiment, with the mobile telephone 10 set into the telephone holder 11, when an incoming call is received, rather than sounding an audible ringing, a received-call display only is displayed on the HUD 60 and, if the driver does not respond to the call for a prescribed amount of time, a transition is made to the automatic message recording processing, whereby digital recording is done, and a message-recorded display only is made. If the driver notices the received-call display and issues a playback command, the driver is allowed to hear a simplified summary automatically generated from the recorded message, so that the driver need not pay a great deal of attention to the playback of the message, thereby enabling the driver to continuing driving without particular concern.

In the foregoing embodiments of the present invention, the description was for the case in which an HUD 60 is used to display a received-call icon or a telephone number on the windshield of the vehicle, it will be understood that the same effect can be achieved using a monitor installed within the vehicle. It will also be understood that the HUD 60 can be a head-up display that is retrofit to the vehicle.

The contents of Japanese Patent Application No. 11-226610 and Japanese Patent Application No. 2000-186960 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A hands-free telephone apparatus for vehicles, comprising:
    a telephone holder configured to hold a mobile telephone;
    a display configured to indicate information;
    a microphone and a speaker for a hands-free telephone call;
    an operation inputter;
    a vehicle speed sensor; and
    a controller connected to the mobile telephone held in the telephone holder, wherein
        the controller further comprises:
            a communication controller performing an incoming call control to be responsible for a reception of an incoming telephone call at the mobile telephone held in the telephone holder to control the display to indicate the reception, without issuing an audible ringing, for detection of a prescribed operation input from the operation inputter within a prescribed amount of time after the reception, to have a telephone connection established to enable a hands-free call using the microphone and the speaker, and for non-detection of a prescribed operation input from the operation inputter within the prescribed amount of time after the reception, to enter an automatic call response, and wherein
                the communication controller configured to control the display to indicate the reception at a position in a peripheral vision region closer to a central vision region, as the vehicle speed sensor detects a greater vehicle speed.

2. A hands-free telephone apparatus according to claim 1, wherein the display comprises a head-up display.

3. A hands-free telephone apparatus according to claim 1, wherein the controller further comprises:
    an inter-vehicle distance tracking controller configured to keep an inter-vehicle distance between the vehicle and a preceding vehicle distance longer, for detection of a prescribed operation input from the operation-inputter to the communication controller within a prescribed amount of time after the reception.

4. A hands-free telephone apparatus according to claim 1, wherein the controller further comprises:
    a braking force controller configured to control a braking force of the vehicle to have an inter-vehicle matching with a reference inter-vehicle distance depending on a vehicle speed, and the braking force controller applying a first braking force when the inter-vehicle distance is shorter than the reference inter-vehicle distance, for detection of a prescribed operation input from the operation inputter to the communication controller within a prescribed amount of time after the reception.

5. A hands-free telephone apparatus according to claim 4, wherein the controller further comprises:
    a brake pedal operation detector configured to detect a brake pedal operation of the vehicle, and wherein the braking force controller applies a second braking force greater than the first braking force, for non-detection of the brake pedal operation by the brake pedal operation detector.

6. A hands-free telephone apparatus for vehicles, comprising:
    a telephone holder configured to hold a mobile telephone in a vehicle;
    a display configured to indicate information;
    a microphone and a speaker for a hands-free telephone call;
    an operation inputter;
    a vehicle speed sensor; and
    a controller connected to the mobile telephone held in the telephone holder, wherein
        the communication controller further comprises
            a communication controller performing an incoming call control to be responsible
            for a reception of an incoming telephone call at the mobile telephone held in the telephone holder to control the display to indicate the reception in a peripheral vision region out of a central vision region of a driver, without issuing an audible ringing, and wherein
                the communication controller configured to control the display to indicate the reception at a position in the peripheral vision region closer to the central vision region, as the vehicle speed sensor detects a greater vehicle speed.

7. A hands-free telephone apparatus according to claim 6, further comprising a message recorder, and the communication controller configured to be responsible for non-detection of a response to the incoming call after the detection of the reception, control the message recorder to start.

8. A hands-free telephone apparatus according to claim 7, wherein the message recorder is configured to convert an analog voice to a digital signal, record the digital signal, converts the digital signal to text data by a voice recognition, prepare a summary of the text data, and perform a voice synthesis of the summary to be output from the speaker.

9. A hands-free telephone apparatus according to claim 7, wherein the message recorder is configured to control, when recording a message, the display to indicate a presence of the message recorded in the message recorder.

10. A hands-free telephone apparatus according to claim 6, wherein the communication controller is configured to store an incoming call telephone number detected by the mobile telephone.

11. A hands-free telephone apparatus according to claim 6, wherein the display comprises a head-up display.

12. A hands-free telephone apparatus according to claim 6 wherein the controller further comprises:
    an inter-vehicle distance tracking controller configured to keep an inter-vehicle distance between the vehicle and a preceding vehicle distance longer, for detection of a prescribed operation input from the operation inputter to the communication controller within a prescribed amount of time after the reception.

13. A hands-free telephone apparatus according to claim 6, wherein the controller further comprises:
    a braking force controller configured to control a braking force of the vehicle to have an inter-vehicle matching with a reference inter-vehicle distance depending on a vehicle speed, and the braking force controller applying a first braking force when the inter-vehicle distance is shorter than the reference inter-vehicle distance, for detection of a prescribed operation input from the operation inputter to the communication controller within a prescribed amount of time after the reception.

14. A hands-free telephone apparatus according to claim 13, wherein the controller further comprises:
    a brake pedal operation detector configured to detect a brake pedal operation of the vehicle, and wherein the braking force controller applies a second braking force greater than the first braking force, for non-detection of the brake pedal operation by the brake pedal operation detector.

15. A hands-free telephone apparatus for vehicles, comprising:
   a telephone holder for holding a mobile telephone in a vehicle;
   display means for indicating information;
   a microphone and a speaker for a hands-free telephone call;
   operation input means for inputting an operation;
   a vehicle speed sense means; and
   control means connectable to the mobile telephone held in the telephone holder, wherein the control means further comprises:
      communication control means for performing an incoming call control to be responsible
      for a reception of an incoming telephone call at the mobile telephone held in the telephone holder to control the display means to indicate the reception, without issuing an audible ringing,
      for detection of the operation input from the operation input means within a prescribed amount of time after the reception, to have a telephone connection established to enable a hands-free call using the microphone and the speaker, and
      for non-detection of the operation input from the operation input means within the prescribed amount of time after the reception, to enter an automatic call response, and wherein
         the communication control means configured to control the display to indicate the reception at a position in the peripheral vision region closer to the central vision region, as the vehicle speed sense means detects a greater vehicle speed.

16. A hands-free telephone apparatus according to claim 15, wherein the control means further comprises:
   an inter-vehicle distance tracking control means configured to keep an inter-vehicle distance between the vehicle and a preceding vehicle distance longer, for detection of a prescribed operation input from the operation input means to the communication control means within a prescribed amount of time after the reception.

17. A hands-free telephone apparatus according to claim 15, wherein the controller further comprises:
   a braking force control means configured to control a braking force of the vehicle to have an inter-vehicle matching with a reference inter-vehicle distance depending on a vehicle speed, and the braking force control means applying a first braking force when the inter-vehicle distance is shorter than the reference inter-vehicle distance, for detection of a prescribed operation input from the operation inputter to the communication control means within a prescribed amount of time after the reception.

18. A hands-free telephone apparatus for vehicles, comprising:
   a telephone holder for holding a mobile telephone in a vehicle;
   display means for indicating information;
   a microphone and a speaker for a hands-free telephone call;
   operation input means for inputting an operation;
   a vehicle speed sense means; and
   control means connectable to the mobile telephone held in the telephone holder, wherein the control means further comprises:
      communication control means for performing an incoming call control to be responsible for
      a reception of an incoming telephone call at the mobile telephone held in the telephone holder to control the display means to indicate the reception in a peripheral vision region out of a central vision region of a driver, without issuing an audible ringing, and wherein
         the communication control means configured to control the display to indicate the reception at a position in the peripheral vision region closer to the central vision region, as the vehicle speed sense means detects a greater vehicle speed.

19. A hands-free telephone apparatus according to claim 18, wherein the control means further comprises:
   an inter-vehicle distance tracking control means configured to keep an inter-vehicle distance between the vehicle and a preceding vehicle distance longer, for detection of a prescribed operation input from the operation input means to the communication control means within a prescribed amount of time after the reception.

20. A hands-free telephone apparatus according to claim 18, wherein the controller further comprises:
   a braking force control means configured to control a braking force of the vehicle to have an inter-vehicle matching with a reference inter-vehicle distance depending on a vehicle speed, and the braking force control means applying a first braking force when the inter-vehicle distance is shorter than the reference inter-vehicle distance, for detection of a prescribed operation input from the operation inputter to the communication control means within a prescribed amount of time after the reception.

21. A control method for hands-free telephone apparatus for vehicles including a telephone holder configured to hold a mobile telephone in a vehicle, a display configured to indicate information, a microphone and a speaker for a hands-free telephone call, an operation inputter, and a vehicle speed sensor, the control method comprising:
   responding to a reception of an incoming telephone call at the mobile telephone held in the telephone holder, by controlling the display to indicate the reception, without issuing an audible ringing;
   responding to detection of a prescribed operation input from the operation inputter within a prescribed amount of time after the reception, by having a telephone connection established to enable a hands-free call using the microphone and the speaker; and
   responding to non-detection of a prescribed operation input from the operation inputter within the prescribed amount of time after the reception, by entering an automatic call responses,
   controlling the display to indicate the reception at a position in a peripheral vision region closer to a central vision region, as the vehicle speed sensor detects a greater vehicle speed.

22. A control method for hands-free telephone apparatus, according to claim 21, wherein the hands-free telephone apparatus further comprises: an inter-vehicle distance tracking controller, and wherein
   the control method further comprising:
      keeping an inter-vehicle distance between the vehicle distance and a preceding vehicle to a reference inter-vehicle distance, making the reference inter-vehicle distance longer, for detection of a prescribed operation input from the operation inputter within a prescribed amount of time after the reception.

23. A control method for hands-free telephone apparatus according to claim 20, wherein the hands-free telephone apparatus further comprises:

a braking force controller, and wherein
the control method further comprises:
controlling a braking force of the vehicle to have an inter-vehicle distance between the vehicle and a preceding vehicle matching with a reference inter-vehicle distance depending on a vehicle speed
applying a first braking force when the inter-vehicle distance is shorter than the reference inter-vehicle distance, for detection of a prescribed operation input from the operation inputter within a prescribed amount of time after the reception.

24. A control method for a hands-free telephone apparatus for vehicles including a telephone holder configured to hold a mobile telephone in a vehicle, a display configured to indicate information, a microphone and a speaker for a hands-free telephone call, and a vehicle speed sensor, the control method comprising:

responding to a reception of an incoming telephone call at the mobile telephone held in the telephone holder, by controlling the display to indicate the reception in a peripheral vision region out of a central vision region of a driver, without issuing an audible ringing, controlling the display to indicate the reception at a position in a peripheral vision region closer to a central vision region, as the vehicle speed sensor detects a greater vehicle speed.

25. A control method for hands-free telephone apparatus, according to claim 24, wherein the hands-free telephone apparatus further comprises: an inter-vehicle distance tracking controller, and wherein the control method further comprising:
keeping an inter-vehicle distance between the vehicle distance and a preceding vehicle to a reference inter-vehicle distance,
making the reference inter-vehicle distance longer, for detection of a prescribed operation input from the operation inputter within a prescribed amount of time after the reception.

26. A control method for hands-free telephone apparatus according to claim 24, wherein the hands-free telephone apparatus further comprises:

a braking force controller, and wherein
the control method further comprises:
controlling a braking force of the vehicle to have an inter-vehicle distance between the vehicle and a preceding vehicle matching with a reference inter-vehicle distance depending on a vehicle speed
applying a first braking force when the inter-vehicle distance is shorter than the reference inter-vehicle distance, for detection of a prescribed operation input from the operation inputter within a prescribed amount of time after the reception.

* * * * *